3,542,729
STABILIZATION OF SYNTHETIC POLYMERS
Keisuke Murayama, Syoji Morimura, Tomoyuki Kurumada, and Ichiro Watanabe, Tokyo, Japan, assignors to Sankyo Company Limited, Tokyo, Japan
No Drawing. Filed June 19, 1968, Ser. No. 738,105
Claims priority, application Japan, Mar. 19, 1968, 43/17,876
Int. Cl. C08f 45/60; C08g 51/60
U.S. Cl. 260—45.8                  5 Claims

ABSTRACT OF THE DISCLOSURE

Synthetic polymers such as polyolefin, polyurethane polyamide and the like are stabilized against the photo-deterioration thereof by having incorporated therein a compound selected from the group consisting of piperidine-spiro-imidazolidine derivatives, piperidine-spiro-hydantoin derivatives and piperidine-spiro-oxazalidine derivatives, in a sufficient amount to effectively prevent such deterioration, usually in the order of about 0.005–2.0% by weight based upon the weight of the polymer employed.

---

This invention relates to the stabilization of synthetic polymers. More particularly, it is concerned with the stabilization of synthetic polymers against the photo-deterioration thereof by having incorporated therein a sufficient amount to prevent such deterioration of the piperidine compound having the formula

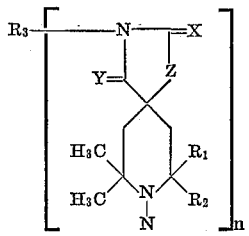

(I)

wherein

X is oxygen or sulfur atom;
Y is oxygen atom or imino group (=NH);
Z is oxygen atom or imino group (=NH);
$R_1$ and $R_2$ may be the same or different and each represents an alkyl group of 1 to 4 carbon atoms; $n$ is an integer of 1 or 2; and, when $n$ is an integer of 1,
$R_3$ is an alkyl group, a cycloalkyl group of 5 to 7 ring carbon atoms, or an aryl group of 6 or 10 ring carbon atoms which may be substituted with a halogen atom, an alkyl group of 1 to 4 carbon atoms or an alkoxy group of 1 to 4 carbon atoms, and, when $n$ is an integer of 2,
$R_3$ is an arylene group which may be substituted with an alkyl group of 1 to 4 carbon atoms, an alkylene group, or the group

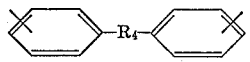

in which $R_4$ is oxygen atoms, sulfur atom, imino group (—NH—), the group —S—S—, or the group —(CH$_2$)$_m$— ($m$ is an integer of 1 to 6 inclusive).

Also, this invention is concerned with the synthetic polymers thus stabilized.

The "synthetic polymers" herein described are intended to include homopolymers of olefins such as high and low pressure polyethylenes, polypropylene, polybutadiene, polyisoprene, polystyrene and the like; copolymers of olefins with other ethylenically unsaturated monomers such as ethylene-propylene copolymers, styrene-butadiene copolymers, acrylonitrile-butadiene-styrene copolymers and the like; polyurethanes; polyamides such as 6 nylon, 6–6 nylon and the like; polyacetals; polyesters such as polyethylene terephthalate and the like; and polymerized vinyl monomers such as polyvinyl chloride, polyvinyl acetate, polyvinylidene chloride, polyvinyl ethers, polyvinyl ketones and the like. These synthetic polymers may be of any shape or form, for example, including filament, fiber, yarn, film, sheet, other shaped article, latex, foam and the like.

These synthetic polymers frequently tend to undergo photo-deterioration when exposed outdoors or indoors to light such as sunlight or ultraviolet light. There have been heretofore proposed various types of stabilizers for the protection of these synthetic polymers against such photo-deterioration. For instance, a great number of light stabilizers have been suggested in the art for the purpose of stabilizing the synthetic polymers, for example, polyolefins and polyurethanes against such photo-deterioration. Especially, there are favourably recommended as light stabilizers such chemicals as 2-(2′-hydroxy-5′-methylphenyl)-benzotriazole; 2 - hydroxy-4-n-octoxybenzophenone, 1,1 - bis(2-methyl-4-hydroxy-4-tert.-butylphenyl)n-butane and the like. Although these prior art light stabilizers are widely employed in the art, various attempts are being made in the art in order to develop more favourable light stabilizers.

As a result of our extensive investigations on light stabilizers, it has been unexpectedly found that the above-specified piperidine compounds of the Formula I exhibit an exceptionally high degree of stabilizing action on the synthetic polymers against photo-deterioration thereof and also that they show little thermal sublimation and no appreciable coloring action on the synthetic polymers to be stabilized.

It is, therefore, a primary object of this invention to provide a novel class of light stabilizers for the synthetic polymers against photo-deterioration.

Another object of this invention is to provide the synthetic polymers stabilized against photo-deterioration by having incorporated therein an effectively stabilizing amount of the piperidine compounds of the Formula I.

Still another object of this invention is to provide a method for the stabilization of the synthetic polymer against photo-deterioration thereof which comprises incorporating into said polymer an effectively stabilizing amount of the piperidine compounds of the Formula I.

The piperidine compounds of the above Formula I which are useful in this invention are all novel substances. More specifically, these novel piperidine compounds of the Formula I include the four groups of the piperidine compounds having the following Formulae I–a, I–b, I–c and I–d, respectively; that is

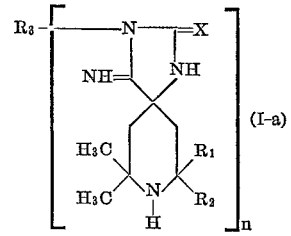

(I-a)

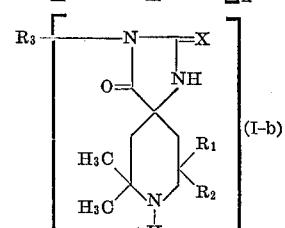

(I-b)

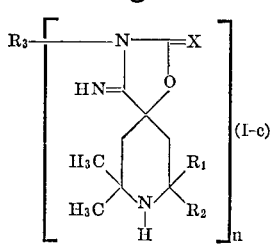

(I-c)

and

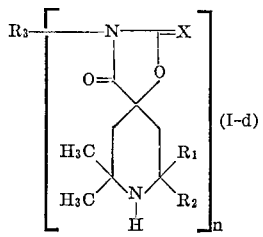

(I-d)

In the above formulae, $R_1$, $R_2$, $R_3$, X and $n$ are as defined above.

Representative examples of the piperidine compounds having the above Formulae I–a, I–b, I–c and I–d are listed hereinbelow. It is, however, to be understood that the present invention is not limited to those illustrated compounds.

Representative of the piperidine compounds of the Formula I–a are:

(1) 1,3,8-triaza-2-oxo-3-phenyl-4-imino-7,7,9,9-tetramethyl-spiro[4.5] decane (M.P. 176–177° C.);
(2) 1,3,8-triaza-2-oxo-3-(o-chlorophenyl)-4-imino-7,7,9,9-tetramethyl-spiro[4.5]decane (M.P. 210–211° C.);
(3) 1,3,8-triaza-2-oxo-3-(m-chlorophenyl)-4-imino-7,7,9,9-tetramethyl-spiro[4.5]decane (M.P. 157–158° C.);
(4) 1,3,8-triaza-2-oxo-3-(p-chlorophenyl)-4-imino-7,7,9,9-tetramethyl-spiro[4.5]decane (M.P. 225–226° C.);
(5) 1,3,8-triaza-2-oxo-3-(p-tolyl)-4-imino-7,7,9,9-tetramethylspiro[4.5]decane;
(6) 1,3,8-triaza-2-oxo-3-(o-methoxyphenyl)-4-imino-7,7,9,9-tetramethyl-spiro[4.5]decane;
(7) 1,3,8-triaza-2-oxo-3-(α-naphthyl)-4-imino-7,7,9,9-tetramethyl-spiro[4.5]decane (M.P. 251–252° C.);
(8) 1,3,8-triaza-2-oxo-3-ethyl-4-imino-7,7,9,9-tetramethyl-spiro[4.5]decane (M.P. 156–157° C.);
(9) 1,3,8-triaza-2-oxo-3-stearyl-4-imino-7,7,9,9-tetramethyl-spiro[4.5]decane (M.P. 114–115° C.);
(10) 1,3,8-triaza-2-oxo-3-cyclohexyl-4-imino-7,7,9,9-tetramethyl-spiro[4.5]decane (M.P. 211–212° C.);
(11) 2,4-bis(1,3,8-triaza-2-oxo-4-imino-7,7,9,9-tetramethyl-spiro[4.5]-3-decyl)toluene (M.P. 230–232° C.);
(12) 4,4′-bis(1,3,8-triaza-2-oxo-4-imino-7,7,9,9-tetramethyl-spiro[4.5]-3-decyl)diphenylmethane (M.P. 218–219° C.);
(13) 4,4′-bis(1,3,8-triaza-2-oxo-4-imino-7,7,9,9-tetramethyl-spiro[4.5]-3-decyl)diphenylether (M.P. 224–226° C.);
(14) 1,6-bis(1,3,8-triaza-2-oxo-4-imino-7,7,9,9-tetramethyl-spiro[4.5]-3-decyl)n-hexane (M.P. 259–260° C.);
(15) 4,4′-bis(1,3,8-triaza-2-oxo-4-imino-7,7,9,9-tetramethyl-spiro[4.5]-3-decyl)bisphenyl;
(16) P,P′-bis(1,3,8-triaza-2-oxo-4-imino-7,7,9,9-tetramethyl-spiro[4.5]-3-decyl)bibenzyl;
(17) 4,4′-bis(1,3,8-triaza-2-oxo-4-imino-7,7,9,9-tetramethyl-spiro[4.5]-3-decyl)diphenylsulfide;
(18) 4,4′-bis(1,3,8-triaza-2-oxo-4-imino-7,7,9,9-tetramethyl-spiro[4.5]-3-decyl)diphenyldisulfide;
(19) 4,4′-bis(1,3,8-triaza-2-oxo-4-imino-7,7,9,9-tetramethyl-spiro[4.5]-3-decyl)diphenylamine;
(20) 1,3,8-triaza-2-thioxo-3-phenyl-4-imino-7,7,9,9-tetramethyl-spiro[4.5]decane (M.P. 176–177° C.);
(21) 1,3,8-triaza-2-thioxo-3-cyclohexyl-4-imino-7,7,9,9-tetramethyl-spiro[4.5]decane (M.P. 176–178° C.);
(22) 1,3,8-triaza-2-thioxo-3-(α-naphthyl-4-imino-7,7,9,9-tetramethyl-spiro[4.5]decane (M.P. 221–222° C.);
(23) 1,3,8-triaza-2-thioxo-3-ethyl-4-imino-7,7,9,9-tetramethyl-spiro[4.5]decane (M.P. 215–216° C.).

Representative of the piperidine compounds of the Formula I–b are:

(24) 1,3,8-triaza-2,4-dioxo-3-phenyl-7,7,9,9-tetramethyl-spiro[4.5]decane (M.P. 148–149° C.);
(25) 1,3,8-triaza-2,4-dioxo-3-(m-chlorophenyl)-7,7,9,9-tetramethyl-spiro[4.5]decane (M.P. 162–163° C.);
(26) 1,3,8-triaza-2,4-dioxo-3-(p-chlorophenyl)-7,7,9,9-tetramethyl-spiro[4.5]decane (M.P. 200–201° C.);
(27) 1,3,8-triaza-2,4-dioxo-3-(α-naphthyl)-7,7,9,9-tetramethyl-spiro[4.5]decane (M.P. 237–238° C.);
(28) 1,3,8-triaza-2,4-dioxo-3-ethyl-7,7,9,9-tetramethyl-spiro[4.5]decane (M.P. 165–166° C.);
(29) 1,3,8-triaza-2,4-dioxo-3-stearyl-7,7,9,9-tetramethyl-spiro[4.5]decane (M.P. 95–96° C.);
(30) 1,3,8-triaza-2,4-dioxo-3-cyclohexyl-7,7,9,9-tetramethyl-spiro[4.5]decane (M.P. 186–187° C.);
(31) 1,3,8-triaza-2,4-dioxo-3-(p-tolyl)-7,7,9,9-tetramethyl-spiro[4.5]decane;
(32) 1,3,8-triaza-2-thioxo-3-phenyl-4-oxo-7,7,9,9-tetramethyl-spiro[4.5]decane;
(33) 1,3,8-triaza-2-thioxo-3-(α-naphthyl)-4-oxo-7,7,9,9-tetramethyl-spiro[4.5]decane (M.P. >260° C.);
(34) 1,3,8-triaza-2-thioxo-3-ethyl-4-oxo-7,7,9,9-tetramethyl-spiro[4.5]decane (M.P. 172–173° C.);
(35) 1,3,8-triaza-2-thioxo-3-cyclohexyl-4-oxo-7,7,9,9-tetramethyl-spiro[4.5]decane;
(36) 2,4-bis(1,3,8-triaza-2,4-dioxo-7,7,9,9-tetramethyl-spiro[4.5]-3-decyl)toluene (M.P. >250° C.);
(37) 4,4′-bis(1,3,8-triaza-2,4-dioxo-7,7,9,9-tetramethyl-spiro[4.5]-3-decyl)diphenylmethane (M.P. 232–234° C.);
(38) 4,4′-bis(1,3,8-triaza-2,4-dioxo-7,7,9,9-tetramethyl-spiro[4.5]-3-decyl)diphenylether (M.P.>260° C.);
(39) 1,6-bis(1,3,8-triaza-2,4-dioxo-7,7,9,9-tetramethyl-spiro[4.5]-3-decyl)n-hexane (M.P. 254–255° C.);
(40) 4,4′-bis(1,3,8-triaza-2,4-dioxo-7,7,9,9-tetramethyl-spiro[4.5]-3-decyl)biphenyl;
(41) p,p′-bis(1,3,8-triaza-2,4-dioxo-7,7,9,9-tetramethyl-spiro[4.5]-3-decyl)bibenzyl;
(42) 4,4′-bis(1,3,8-triaza-2,4-dioxo-7,7,9,9-tetramethyl-spiro[4.5]-3-decyl)diphenyldisulfide;
(43) 4,4′-bis(1,3,8-triaza-2,4-dioxo-7,7,9,9-tetramethyl-spiro[4.5]-3-decyl)diphenyldisulfide;
(44) 4,4′-bis(1,3,8-triaza-2,4-dioxo-7,7,9,9-tetramethyl-spiro[4.5]-3-decyl)diphenylamine.

Representative of the piperidine compounds of the Formula I–c are:

(45) 1-oxa-3,8-diaza-2-oxo-3-phenyl-4-imino-7,7,9,9-tetramethyl-spiro[4.5]decane (M.P. 135-136° C.);
(46) 1-oxa-3,8-diaza-2-oxo-3-cyclohexyl-4-imino-7,7,9,9-tetramethyl-spiro[4.5]decane;
(47) 1-oxa-3,8-diaza-2-oxo-3-(p-chlorophenyl)-4-imino-7,7,9,9-tetramethyl-spiro[4.5]decane (M.P. 161–162° C.);
(48) 1-oxa-3,8-diaza-2-oxo-3-(α-naphthyl)-4-imino-7,7,9,9-tetramethyl-spiro[4.5] decane (M.P. 230–231° C.);
(49) 1-oxa-3,8-diaza-2-oxo-3-ethyl-4-imino-7,7,9,9-tetramethyl-spiro[4.5]decane (M.P. 66–67° C.);
(50) 4,4′-bis(1-oxa-3,8-diaza-2-oxo-4-imino-7,7,9,9-tetramethyl-spiro[4.5]-3-decyl(diphenylether (M.P. 233–235° C.);
(51) 1-oxa-3,8-diaza-2-thioxo-3-phenyl-4-imino-7,7,9,9-tetramethyl-spiro[4.5]decane;

(52) 1-oxa-3,8-diaza-2-thioxo-3-ethyl-4-imino-7,7,9,9-tetramethyl-spiro[4.5]decane;
(53) 4,4'-bis(1-oxa-3,8-diaza-2-oxa-4-imino-7,7,9,9-tetramethyl-spiro[4.5]-3-decyl)biphenyl;

These piperidine compounds (I-a), (I-b), (I-c) and (I-d) can be easily and adventageously produced, for example, through any of particular routes as diagrammatically shown in the following reaction schema;

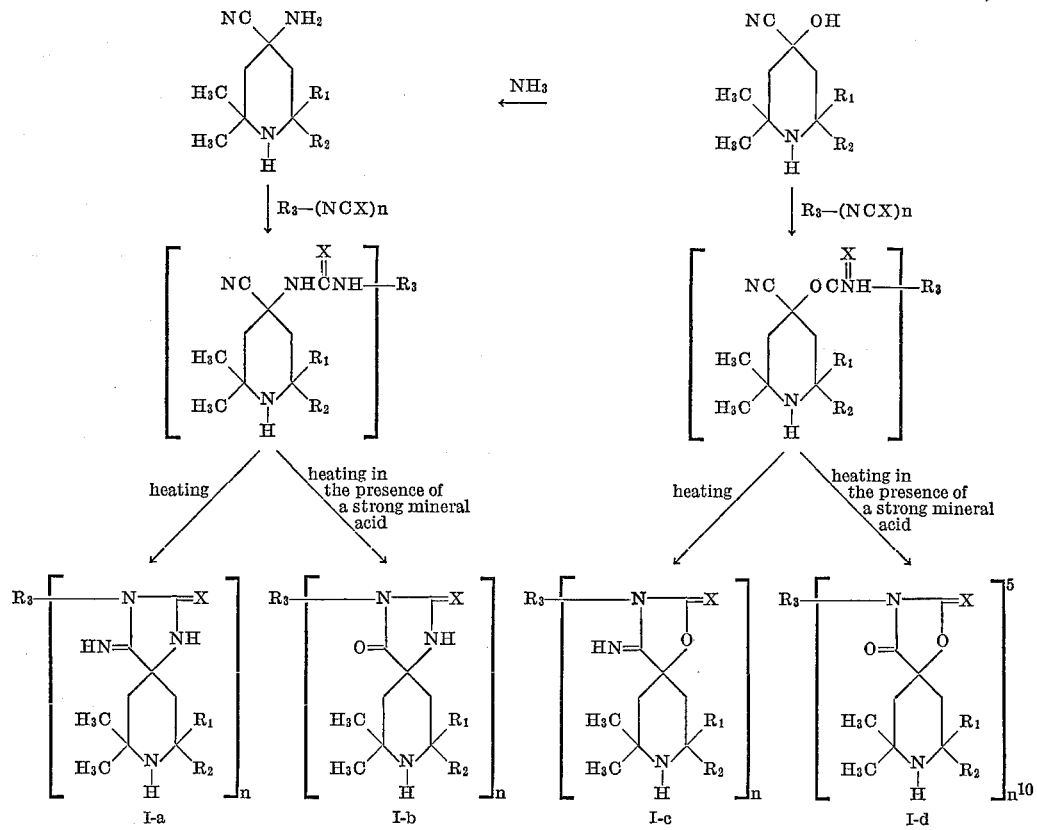

I-a        I-b        I-c        I-d

(54) P,P'-bis(1-oxa-3,8-diaza-2-oxo-4-imino-7,7,9,9-tetramethyl-spiro[4.5]-3-decyl)bibenzyl;
(55) 4-4'-bis(1-oxa-3,8-diaza-2-oxo-4-imino-7,7,9,9-tetramethyl-spiro[4.5]-3-decyl)diphenylsulfide;
(56) 4,4'-bis(1-oxa-3,8-diaza-2-oxo-4-imino-7,7,9,9-tetramethyl-spiro[4.5]-3-decyl)diphenyldisulfide;
(57) 4,4'-bis(1-oxa-3,8-diaza-2-oxo-4-imino-7,7,9,9-tetramethyl-spiro[4.5]-3-decyl)diphenylamine.

Representative of the piperidine compounds of the Formula I–d are:

(58) 1-oxa-3,8-diaza-2,4-dioxo-3-(p-chlorophenyl)-7,7,9,9-tetramethyl-spiro[4.5]decane (M.P. 182–183° C.);
(59) 1-oxa-3,8-diaza-2,4-dioxo-3-(α-naphthyl)-7,7,9,9-tetramethyl-spiro[4.5]decane (M.P. 237–238° C.);
(60) 1-oxa-3,8-diaza-2,4-dioxo-3-ethyl-7,7,9,9-tetramethyl-spiro[4.5]decane;
(61) 1-oxa-3,8-diaza-2,4-dioxo-3-cyclohexyl-7,7,9,9-tetramethyl-spiro[4.5]decane;
(62) 4,4'-bis(1-oxa-3,8-diaza-2,4-dioxo-7,7,9,9-tetramethyl-spiro[4.5]-3-decyl)diphenylether;
(63) 1-oxa-3,8-diaza-2-thioxo-3-phenyl-4-oxo-7,7,9,9-tetramethyl-spiro[4.5]decane;
(64) 1-oxa-3,8-diaza-2-thioxo-3-ethyl-4-oxo-7,7,9,9-tetramethyl-spiro[4.5]decane;
(65) 4,4'-bis(1-oxa-3,8-diaza-2,4-dioxo-7,7,9,9-tetramethyl-spiro[4.5]-3-decyl)biphenyl;
(66) P,P'-bis(1-oxa-3,8-diaza-2,4-dioxo-7,7,9,9-tetramethyl-spiro[4.5]-3-decyl)bibenzyl;
(67) 4,4'-bis(1-oxa-3,8-diaza-2,4-dioxo-7,7,9,9-tetramethyl-spiro[4.5]-3-decyl)diphenylsulfide;
(68) 4,4'-bis(1-oxa-3,8-diaza-2,4-dioxo-7,7,9,9-tetramethyl-spiro[4.5]-3-decyl)diphenyldisulfide; and
(69) 4,4'-bis(1-oxa-3,8-diaza-2,4-dioxo-7,7,9,9-tetramethyl-spiro[4.5]-3-decyl)diphenylamine.

For the purpose of illustrating the preparation of the piperidine compounds (I) as explained above, some embodiments of the preparation of such piperidines are given hereinbelow, this description being incorporated herein solely as a reference.

PREPARATION A

Preparation of 1,3,8-triaza-2-oxo-3-phenyl-4-imino-7,7,9,9-tetramethyl-spiro[4.5]decane To a solution of 2 g. of 4-cyano-4-amino-2,2,6,6-tetramethyl piperidine in 30 ml. of benzene was added dropwise a solution of 1.3 g. of phenyl isocyanate in 30 ml. of benzene with stirring at room temperature. After completion of the dropwise-addition, the reaction mixture was stirred at room temperature for 3 hours and then at 70–80° C. for 1 hour. After cooling, the crystalline substance thus separated was recovered by filtration and then recrystallized from benzene to give 4-cyano-4-(3-phenylureido)-2,2,6,6-tetramethylpiperidine as white crystals melting at 158–159° C.

A solution of 5 g. of the 4-cyano-4-(3-phenylureido)-2,2,6,6-tetramethylpiperidine obtained as above in 100 ml. of 50% aqueous ethanol was heated under reflux for 5 hours. The reaction mixture was concentrated, the crystalline residue thus separated recovered by filtration and then recrystallized from benzene to give the desired product as white crystals melting at 176–177° C.

*Analysis.*—Calculated for $C_{17}H_{24}ON_4$ (percent): C, 67.97; H, 8.05; N, 18.65. Found (percent): C, 68.12; H, 8.08; N, 18.48.

PREPARATION B

Preparation of 1,3,8-triaza-2,4-dioxo-3-(α-naphthyl)-7,7,9,9-tetramethyl-spiro[4.5]decane To a solution of 5 g. of 4-cyano-4-amino-2,2,6,6-tetramethylpiperidine in 30 ml. of benzene was added dropwise a solution of 4.7 g. of α-naphthyl isocyanate in 10 ml. of benzene with stirring at room temperature. After completion of the dropwise-addition, the reaction mixture was stirred at room temperature for 3 hours and then at 70–80° C. for 1 hour. After cooling, the crystalline substance thus separated was recovered by filtration and then recrystallized from benzene to give 4-cyano-4-(3-α-naphthylureido) - 2,2,6,6 - tetramethylpiperidine as white crystals melting at 206–207° C.

A solution of 2 g. of 4-cyano-4-(3-α-naphthylureido)-2,2,6,6-tetramethylpiperidine in 20 ml. of 15% aqueous hydrochloric acid was heated with stirring on a water bath for 8 hours. The reaction mixture was concentrated under reduced pressure and the residue neutralized by addition of sodium carbonate. The crystalline substance thus separated was recovered by filtration, washed with water and then recrystallized from aqueous ethanol to give the desired product as white crystals melting at 237–238° C.

*Analysis.*—Calculated for $C_{21}H_{25}O_2N_3$ (percent): C. 71.77; H, 7.17; N, 11.96. Found (percent): C, 71.65; H, 7.22; N, 11.79.

PREPARATION C

Preparation of 1-oxa-3,8-diaza-2-oxo-3-ethyl-4-imino-7,7,9,9-tetramethyl-spiro[4.5]decane To a solution of 3.5 g. of 4-cyano-4-hydroxy-2,2,6,6-tetramethylpiperidine in a mixture of 80 ml. of benzene and 10 ml. of dimethylformamide was added 1.5 g. of ethyl isocyanate. The resulting mixture was stirred for 2 days while heating to 30–40° C. The reaction mixture was concentrated under reduced pressure to leave an oily residue which was then crystallized with aqueous methanol to give the desired product as white crystals melting at 66–67° C.

*Analysis.*—Calculated for $C_{13}H_{23}N_3O_2$ (percent): C. 61.63; H, 9.15; N, 16.59. Found (percent): C, 61.56; H, 9.21; N, 16.55.

PREPARATION D

Preparation of 1-oxa-3,8-diaza-2,4-dioxo-3-(p-chlorophenyl)-7,7,9,9-tetramethyl-spiro[4.5]decane In 30 ml. of benzene was dissolved with heating 3.8 g. of 4-cyano-4-hydroxy-2,2,6,6 - tetramethylpiperidine. The resulting solution was cooled to room temperature and then 3.5 g. of p-chlorophenyl isocyanate was added thereto. The resulting mixture was stirred for 24 hours while heating at 30–40° C. After removal of the benzene by distillation under reduced pressure, there was left a residue containing some crystalline substances.

To the residue was added 30 ml. of 50% aqueous ethanol and then 20 ml. of conc. hydrochloric acid was gradually added thereto. The reaction mixture was heated under gentle reflux for 8 hours. The reaction mixture was then concentrated under reduced pressure, and the crystalline substance thus separated was washed with benzene. The substance was dissolved in water and the aqueous solution was neutralized with sodium carbonate. The crystalline substance thus separated was recovered by filtration, washed with water, dried and then recrystallized from methanol to give the desired product as white needles melting at 182–183° C.

*Analysis.*—Calc. for $C_{17}H_{21}N_2O_3Cl$ (percent): C, 60.62; H, 6.28; N, 8.32. Found (percent): C, 60.50; H, 6.34; N, 8.27.

Where the piperidine compounds of the above Formula I are to be employed in the synthetic polymer for the purpose of stabilization, they may be readily incorporated into such polymers by various standard procedures commonly utilized in the art. The stabilizer in this invention may be incorporated into the synthetic polymer at any desired stage prior to the manufacture of shaped articles therefrom. For example, the dry stabilizer in a form of powder may be admixed with the synthetic polymer or a suspension or emulsion of such a polymer may be admixed with a suspension or emulsion of the stabilizer of this invention.

The amount of the piperidine compound to be employed in the synthetic polymer in accordance with this invention may be widely varied, depending upon mainly the types, properties and particular use of the polymer to be stabilized.

The usual and preferred concentrations of the stabilizer in this invention may fall within the range of about 0.005–2.0% by weight, and more preferably about 0.01–1.0% by weight, these concentrations being based upon the weight of the synthetic polymer employed.

The piperidine compound (I) of this invention may be optionally and advantageously employed for the purpose of stabilization, either alone or in a combination with other additives such as known stabilizers (including, for example, antioxidants and ultraviolet absorbants), fillers, pigments and the like. In some cases, an optional combination of two or more piperidine compounds (I) may be satisfactorily employed in this invention to obtain the improved results.

The following examples are given solely for the purpose of illustrating the excellent light stability of the piperidine compounds (I) in several synthetic polymers in accordance with this invention. In these examples, all parts are given by weight unless otherwise indicated.

EXAMPLE 1

In a mortar, with 100 parts of polypropylene was intimately admixed 0.2 part of the piperidine compound of this invention specified in the following Table I.

The resulting mixture was preheated to 215° C. under a pressure of 10 kg./cm.$^2$ for 2 minutes and then compression-molded into a sheet of 0.5 mm. thick at 215° C. under pressure of 150 kg./cm.$^2$ for 0.5 minute.

As a control for comparative purpose, the polypropylene sheets were prepared by repeating the same procedure as described above except that the commercially available stabilizer shown in the following Table I was employed instead of the stabilizer of this invention or no stabilizers were incorporated.

Thereafter, all of these sheets thus prepared were tested for the "brittleness time" (which term means the time, expressed in terms of hours, required until the test sheet will become brittle) under ultraviolet irradiation at 45° C. by means of the fade-meter, "Standard Fade-Meter Type FA–1" manufactured and sold by Toyo Rika Instruments Inc., Japan. Such an instrument is a modification of Atlas Fade-O-Meter Type FDA–R (Atlas Electric Devices Co., U.S.A.) and meets the requirements prescribed in the item 3.8 of Japanese Industrial Standard "1044–L."

The results are set forth in the following Table I.

Table I

Stabilizer:
The piperidine compound
in this invention [1]:

| Formula I–a: | Brittleness time (hours) |
|---|---|
| (1) | 420 |
| (2) | 580 |
| (3) | 540 |
| (4) | 540 |
| (5) | 440 |
| (6) | 360 |
| (7) | 460 |
| (8) | 600 |
| (9) | 500 |
| (10) | 740 |
| (11) | 680 |
| (12) | 740 |
| (13) | 440 |
| (14) | 600 |
| (20) | 380 |
| (21) | 420 |

Table I—Continued

Stabilizer:
The piperidine compound in this invention:[1]

Formula I-a: Brittleness time (hours)
- (22) — 460
- (23) — 480

Formula I-b:
- (24) — 400
- (25) — 440
- (26) — 580
- (27) — 500
- (28) — 600
- (29) — 660
- (30) — 740
- (31) — 640
- (32) — 380
- (34) — 500
- (35) — 520
- (36) — 740
- (37) — 760
- (38) — 720
- (39) — 580

Formula I-c:
- (45) — 500
- (46) — 480
- (48) — 460
- (49) — 420
- (51) — 380
- (52) — 360

Formula I-d:
- (58) — 460
- (60) — 400
- (61) — 480
- (63) — 440
- (64) — 360

Commercially available stabilizer:
- 2-(2'-hydroxy-5'-methylphenyl)-benzotriazole — 80
- None — 40

[1] The present piperidine stabilizer is represented by the number as set forth in the foregoing, for convenience.

EXAMPLE 2

The same procedure as in the above Example 1 was repeated except that an equivalent amount of polystyrene was employed instead of the polypropylene to make up thin polystyrene films, each being of 0.1 mm. thickness.

These films were exposed to ultraviolet light for 300 hours in the fade-meter described in the above Example 1. Before and after the exposure, infrared spectra of these films were measured by a conventional means. Then the degrees of increase in absorbancy at 1720 cm.$^{-1}$ were calculated by subtracting the absorbancy after exposure from that before exposure.

The results are set forth in the following Table II.

Table II

Stabilizer:
The piperidine compound in this invention[1]: Degree of increase in absorbancy at 1720 cm.$^{-1}$ (percent)

Formula I-a:
- (1) — 4
- (2) — 3
- (4) — 4
- (5) — 6
- (8) — 5
- (9) — 4
- (10) — 3
- (11) — 6
- (12) — 5
- (14) — 4
- (20) — 6
- (21) — 6

Formula I-b:
- (24) — 4
- (25) — 3
- (26) — 4
- (28) — 4
- (29) — 4
- (30) — 3
- (32) — 6
- (34) — 5
- (35) — 5
- (36) — 5
- (37) — 4
- (39) — 2

Formula I-c:
- (45) — 6
- (46) — 5
- (49) — 6
- (51) — 6
- (52) — 6

Formula I-d:
- (60) — 4
- (61) — 3
- (63) — 5
- (64) — 4

Commercially available stabilizer:
- 2-(2'-hydroxy-5'-methylphenyl)-benzotriazole — 6
- None — 29

[1] See footnote 1 to Table I.

It will be apparent from the results summarized in the above Tables I and II that the piperidine compound (I) of this invention shows excellent stabilizing action on the synthetic polymer, especially polyolefin, against the photo-deterioration thereof, as compared with the known light stabilizers.

EXAMPLE 3

One hundred part of 6 nylon (polycapramide) was intimately admixed with 0.2 part of the piperidine compound of this invention specified in the following Table II.

The resulting mixture was preheated to 235° C. under a pressure of 10 kg./cm.$^2$ for 5 minutes and then compression-molded into a sheet of about 0.1 mm. thick, through a conventional molding machine at that temperature under a pressure of 40 kg./cm.$^2$ for 1 minute.

As a control for comparative purpose, the 6 nylon sheet was molded by the same procedure as described just above except that there was not incorporated any kind of stabilizers.

Thereafter, these films were exposed to ultraviolet light for 80 hours in the fade-meter as described in the above Example 1.

The tensile strength retention of the exposed film was measured by means of a conventional tensile testing machine.

The results are set forth in the following Table III.

Table III

Stabilizer:
The piperidine compound in this invention:[1] Tensile strength retention (percent)

Formula I-a:
- (1) — 92
- (2) — 90
- (4) — 88
- (8) — 86
- (9) — 91
- (10) — 95
- (11) — 87
- (12) — 90
- (14) — 92
- (20) — 80
- (21) — 83

Table III—Continued

Stabilizer:
The piperidine compound
in this invention:[1]  Tensile strength
Formula I-b:  retention (percent)
(24) ---------------------------- 92
(25) ---------------------------- 82
(26) ---------------------------- 90
(27) ---------------------------- 85
(28) ---------------------------- 88
(29) ---------------------------- 93
(30) ---------------------------- 94
(32) ---------------------------- 80
(34) ---------------------------- 83
(35) ---------------------------- 86
(36) ---------------------------- 89
(37) ---------------------------- 92
(39) ---------------------------- 92
Formula I-c:
(45) ---------------------------- 84
(46) ---------------------------- 86
(49) ---------------------------- 79
Formula I-d:
(60) ---------------------------- 84
(61) ---------------------------- 88
(63) ---------------------------- 84
None ------------------------------- 43

[1] See footnote 1 to Table 1.

It will be apparent from the above results that the piperidine compound (I) of this invention exhibit high retentons of tensile strength in the synthetic polymer, especially polyamide, after exposure to light.

What is claimed is:
1. A synthetic polymer being a polymer of α-monoolefin, a polymer having recurring amide groups as integral parts of the main polymer chain or a polyether polyurethane, said polymer being stabilized against deterioration by light, wherein there is incorporated, in a sufficient amount to prevent said deterioration, a compound having the formula

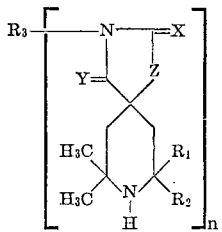

wherein
X is oxygen or sulfur atom;
Y is oxygen atom or imino group (=NH);
Z is oxygen atom or imino group (=NH);
$R_1$ and $R_2$ may be the same or different and each represents an alkyl group of 1 to 4 carbon atoms;
n is an integer of 1 or 2; and,
where n is an integer of 1,
$R_3$ is an alkyl group, a cycloalkyl group of 5 to 7 ring carbon atoms, or an aryl group of 6 to 10 ring carbon atoms which may be substituted with a halogen atom, an alkyl group of 1 to 4 carbon atoms or an alkoxy of 1 to 4 carbon atoms, and,
where n is an integer of 2,
$R_3$ is an arylene group which may be substituted with an alkyl group of 1 to 4 carbon atoms, an alkylene group or the group

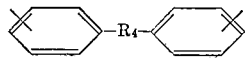

in which $R_4$ is oxygen atom, sulfur atom, imino group (—NH—), the group —S—S—, or the group —($CH_2$)$_m$— (m is an integer of 1 to 6 inclusive).

2. The synthetic polymer according to claim 1 wherein said polymer is polypropylene, polystyrene, polycapramide or a polyurethane derived from polycaprolactone glycol.

3. The synthetic polymer according to claim 1 wherein said amount is in the range of from 0.005 to 2.0% by weight, based upon the weight of said synthetic polymer.

4. The synthetic polymer according to claim 1 wherein said compound is selected from the group consisting of 1,3,8-triazo-2-oxo-3-phenyl-4-imino-7,7,9,9-tetramethyl-spiro[4.5]decane,
1,3,8-triaza-2-oxo-3-(p-chlorophenyl)-imino-7,7,9,9-tetramethyl-spiro[4.5]decane,
1,3,8-triaza-2-oxo-3-ethyl-4-imino-7,7,9,9-tetramethyl-spiro[4.5]decane,
1,3,8-triaza-2-oxo-3-stearyl-4-imino-7,7,9,9-tetramethyl-spiro[4.5]decane,
1,3,8-triaza-2-oxo-3-cycylohexyl-4-imino-7,7,9,9-tetramethyl-spiro[4.5]decane,
2,4-bis(1,3,8-triaza-2-oxo-4-imino-7,7,9,9-tetramethyl-spiro[4,5]-3-decyl)toluene,
4,4'-bis(1,3,8-triaza-2-oxo-4-imino-7,7,9,9-tetramethyl-spiro[4,5]-3-decyl) diphenylmethane,
1,6-bis(1,3,8-triaza-2-oxo-4-imino-7,7,9,9-tetramethyl-spiro[4,5]-3-decyl)n-hexane,
1,3,8-triaza-2-thioxo-3-phenyl-4-imino-7,7,9,9-tetramethyl-spiro[4.5]decane,
1,3,8-triaza-2-thioxo-3-cyclohexyl-4-imino-7,7,9,9-tetramethyl-spiro[4.5]decane,
1,3,8-triaza-2,4-dioxo-3-phenyl-7,7,9,9-tetramethyl-spiro[4.5]decane,
1,3,8-triaza-2,4-dioxo-3-(p-chlorophenyl)-7,7,9,9-tetramethyl-spiro[4.5]decane,
1,3,8-triaza-2,4-dioxo-3-ethyl-7,7,9,9-tetramethyl-spiro[4.5]decane,
1,3,8-triaza-2,4-dioxo-3-stearyl-7,7,9,9-tetramethyl-spiro[4.5]decane,
1,3,8-triaza-2,4-dioxo-3-cyclohexyl-7,7,9,9-tetramethyl-spiro[4.5]decane,
2,4-bis(1,3,8-triaza-2,4-dioxo-7,7,9,9-tetramethyl-spiro[4.5]-3-decyl)toluene,
4,4'-bis(1,3,8-triaza-2,4-dioxo-7,7,9,9-tetramethyl-spiro[4,5]-3-decyl)diphenylmethane, and
1,6-bis(1,3,8-triaza-2,4-dioxo-7,7,9,9-tetramethyl-spiro[4,5]-3-decyl)n-hexane.

5. The synthetic polymer according to claim 4 wherein said compound is incorporated in an amount of from 0.01 to 1.0% by weight, based upon the weight of said synthetic polymer.

References Cited

UNITED STATES PATENTS

| | | | |
|---|---|---|---|
| 3,313,819 | 4/1967 | Griot | 260—294 |
| 3,325,445 | 6/1967 | Harris et al. | 260—45.8 |
| 3,325,499 | 6/1967 | Poos | 260—294 |
| 3,399,192 | 8/1968 | Regnier et al. | 260—240 |
| 3,431,233 | 3/1969 | Murayama et al. | 260—45.8 |
| 3,448,074 | 6/1969 | Kitaoka et al. | 260—45.8 |

DONALD E. CZAJA, Primary Examiner

DONALD A. WHITE, Assistant Examiner

U.S. Cl. X.R.

260—45.95, 293, 307, 309.5